Feb. 20, 1968 K. C. MERRELL ETAL 3,370,224
DIRECT CURRENT RESISTANCE BRIDGE CIRCUIT
Filed Oct. 7, 1965
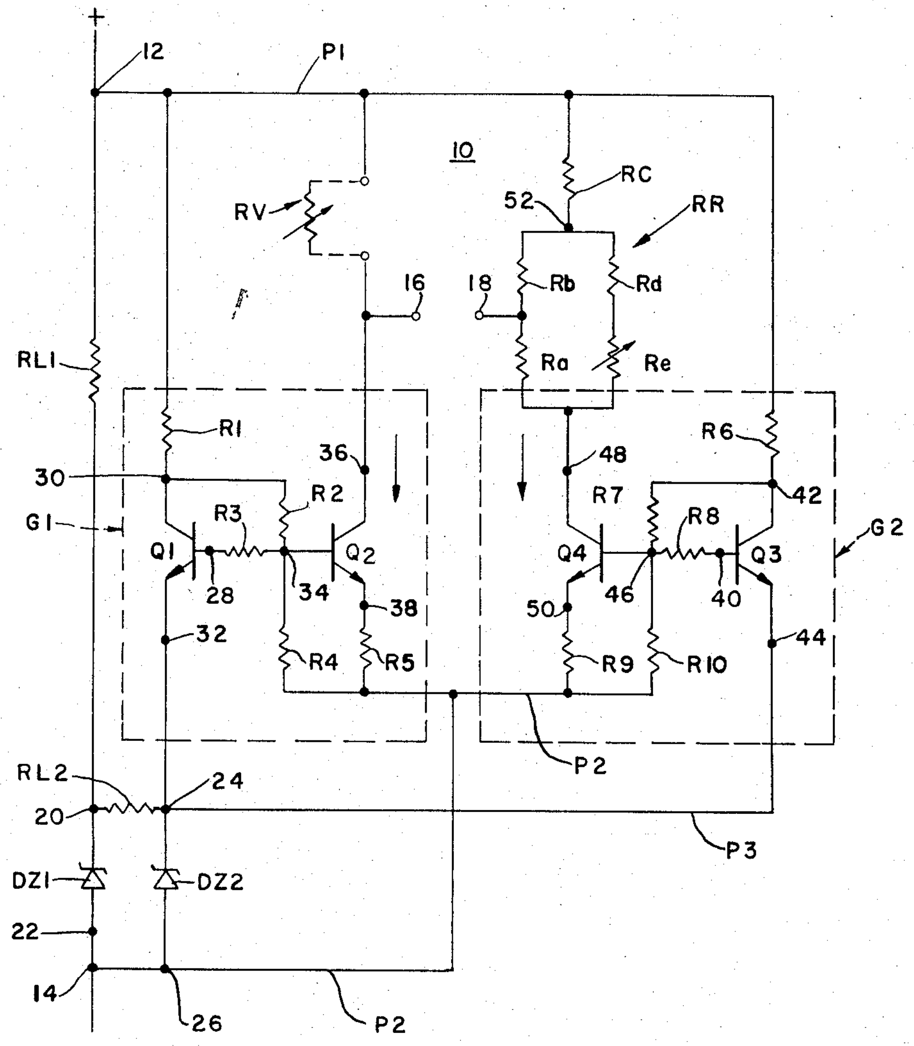
INVENTORS
Kenneth C. Merrell &
James H. Koegel
BY Birch & Birch
ATTORNEYS United States Patent Office 3,370,224
Patented Feb. 20, 1968

3,370,224

DIRECT CURRENT RESISTANCE BRIDGE CIRCUIT

Kenneth C. Merrell, Brea, and James H. Koegel, Placentia, Calif., assignors to Robertshaw Controls Company, Richmond, Va., a corporation of Delaware Filed Oct. 7, 1965, Ser. No. 493,667
13 Claims. (Cl. 323—75)

This invention relates to resistance bridge circuits and more particularly to resistance bridge circuits having new and novel current supply means.

It is an object of this invention to provide a new and novel resistance bridge circuit of the direct current type.

It is another object of this invention to provide a new and novel resistance bridge circuit of the direct current type including a new and novel current supply therefor, comprising a constant current source through each side of the said bridge circuit effecting a direct current output voltage across a diagonal of said bridge as a function of resistance change in one side of said bridge.

Another object of this invention is to provide a new and novel resistance bridge and constant current source for same wherein said source is insensitive to supply voltage and ambient temperature variations.

Still another object of this invention is to provide a new and novel constant current energized direct current resistance bridge circuit permitting operation at optimally low supply voltages and precluding non-linear response characteristics caused by bridge loading.

Yet another object of this invention is to provide a new and novel resistance bridge circuit having novel zero setting means therein.

These and other objects of this invention will become more fully apparent with reference to the following specification and drawings, which relate to a preferred embodiment of the invention.

In the drawings:

The sole figure is a schematic diagram of a direct current resistance bridge circuit of the present invention.

Referring in detail to the drawing, the bridge circuit 10 is shown as including a pair of diagonally disposed supply terminals 12 and 14 having power leads P1 and P2, respectively, extending therefrom, and a pair of diagonally disposed output terminals 16 and 18.

The bridge 10 includes a first or input side comprising a variable input resistance arm RV, connected in series between power input terminal 12 and output terminal 16, and a first reference current generator G1 including an output stage to be hereinafter more fully described, the said output stage having a current path connected in series between the said output terminal 16 and the other power input terminal 14.

The bridge 10 further includes a second reference side comprising an adjustable reference resistance network RR connected at one side thereof to power input terminal 12 and including output terminal 18, and a second reference current generator G2 including an output stage to be hereinafter more fully described, the said output stage having a current path connected in series from the other end of said reference resistance network RR to the other power input terminal 14.

A voltage reference means comprising a first limiting resistance RL1, connected in series with the cathode 20 of a first Zener diode DZ1 from the positive power input terminal 12, the anode 22 of the said Zener diode DZ1 being connected to the common power input terminal 14; and a second current limiting resistance RL2 connected in series from the cathode 20 of the first Zener diode DZ1 to the cathode 24 of a second Zener diode DZ2, the latter having its anode 26 connected with the common power terminal 14; the said reference voltage means providing a fixed reference potential at the cathode terminal 24 of the second Zener diode DZ2 for a purpose to be hereinafter more fully described. A reference potential lead P3, common to the first and second current generators G1 and G2 extends from the said cathode terminal 24, hereinafter referred to as the reference node 24.

The first current generator G1 includes as its active circuit elements, first and second transistors Q1 and Q2, respectively, of like polarity and substantially identical electrical characteristics, the said first transistor Q1 including base, collector and emitter terminals 28, 30 and 32, respectively, and the said second transistor Q2 including base, collector and emitter terminals 34, 36 and 38, respectively.

The first transistor Q1 is connected at its collector terminal 30 through a current limiting first resistance R1 to the positive power terminal 12 via power lead P1, hereinafter referred to as the positive lead P1, and through a second resistance R2 to the base terminal 34 of the second transistor Q2; connected at its emitter terminal 32 directly to the reference node 24; and connected at its base terminal 28 through a coupling third resistance R3 to the base terminal 34 of the second transistor Q2.

The second transistor Q2 is connected at its collector terminal 36 with the output terminal 16; connected at its base terminal 34 through a fourth resistance R4 to the common lead P2; and further connected at its emitter 38 through a fixed load fifth resistance R5 to the common lead P2. The first, second and fourth resistors R1, R2 and R4, respectively, thus comprise a series resistance network connected across the positive and common leads P1 and P2.

The aforementioned output stage of the first current generator G1 comprises the second transistor Q2 and the fifth resistance R5, the collector-emitter current path 36–38 of the said second transistor Q2 being connected in a series network with the variable input resistance RV and the fixed load fifth resistance R5 to complete the first or input side of the bridge 10.

The second current generator G2 includes as its active circuit elements third and fourth transistors Q3 and Q4, respectively, of like polarity and substantially identical electrical characteristics, the said third transistor Q3 including base, collector and emitter terminals 40, 42, and 44, respectively, and the said fourth transistor Q4 including base, collector and emitter terminals 46, 48, and 50, respectively.

The third transistor Q3 is connected at its collector terminal 42 through a current limiting sixth resistance R6 to the positive power lead P1, and through a seventh resistance R7 to the base terminal 46 of the fourth transistor Q4; connected at its emitter terminal 44 to the voltage reference node 24 via the reference lead P3; and connected at its base terminal 40 through a coupling eighth resistance R8 to the base terminal 46 of the fourth transistor Q4.

The fourth transistor Q4 is connected at its collector terminal 48 with that end of the reference resistance network RR remote form the positive lead P1; connected at its emitter terminal 50 through a fixed load ninth resistance R9 to the common lead P2; and connected at its base terminal 46 through a tenth resistance R10 to the common lead P2. The sixth, seventh and tenth resistances R6, R7 and R10, respectively, thus comprise a series resistance network connected across the positive and common leads P1 and P2.

The aforementioned output stage of the second current generator G2 comprises the fourth transistor Q4 and the ninth resistance R9, the collector-emitter current path 48–50 of the said fourth transistor Q4 being connected in a series network with the reference resistance network RR and the fixed load ninth resistance R9 to complete the second or reference side of the bridge 10.

Extending from the collector terminal 48 of the fourth transistor Q4 to the positive lead P1, the reference resistance network RR comprises series connected resistors R*a* and R*b* having a common node therebetween comprising the output terminal 18, said resistor R*a* and R*b* being in series with a resistance R*c*, the latter being connected from a node 52 to the positive lead P1. The reference resistance network RR is completed by means of a second pair of series resistors R*d* and R*e* connected in shunt with the first pair R*a* and R*b* from the collector terminal 48 to the node 52, the resistance 52*e* being variable for a purpose to be hereinafter more fully described.

OPERATION

Referring again to the drawing, the operation of the illustrated embodiment of the present invention will now be described, assuming that a direct current voltage source is connected across the positive and negative power input terminals 12 and 14, respectively.

Because of the potential difference between the lines P1 and P2, the first Zener diode DZ1 will break down in the reverse direction and current will flow through the said diode DZ1 and the first current limiting resistance RL1, establishing a constant voltage across the said first Zener diode DZ1. Accordingly, the second Zener diode DZ2 will break down in the reverse direction and current will flow from the cathode 20 of the first Zener diode DZ1, through the second limiting resistance RL2 and the second Zener diode DZ2 to thereby establish a constant (reference) voltage at the reference node 24. Furthermore, this results in the establishment of the same reference voltage a the emitter terminals 32 and 44 (via the lead P3) of the first and third transistors Q1 and Q3, resectively.

Because of the potential difference across the positive common leads P1 and P2, respectively, current will flow through the voltage divider network R1–R2–R4 in first current generator G1 and through the voltage divider network R6–R7–R10 in the second current generator G2. The resulting voltage appearing at the base terminals 28, 34, 40 and 46 of the first, second, third and fourth transistors Q1, Q2, Q3 and Q4, respectively, causes all of the said transistors to become conductive. Thus, a first current I1 will flow through the input resistance RV and the collector-emitter path 36–38 of the second transistor Q2 and the fixed load resistance R5 of the latter, whereby a first potential will appear at the first output terminal 16. Likewise, a second current 12 will flow through the reference resistance network RR, collector-emitter path 48–50 of the fourth transistor Q4 and the fixed load resistance R9 of the latter, whereby a second potential will appear at the second output terminal 18. Thus, an output voltage appears across the said output terminals 16 and 18 of the bridge 10.

The base to emitter bias voltage of the first transistor Q1 comprises the reference voltage supply for the base terminal 34 of the second transistor Q2. The base currents in the transistors Q1 and Q2 are negligible and the coupling third resistance R3 is for the purpose of impedance matching between the two said transistors.

The first current I1, generated by the first current generator G1 is a function of the fixed load fifth resistance R5 in the emitter circuit of the second transistor Q2 and the voltage appearing across the said fifth resistance R5. Changes in supply voltage for example will result in a change in the degree of conductivity of the collector-emitter path of the first transistor Q1, the voltage at the collector 30 will vary correspondingly in the opposite sense to the change in supply voltage and the voltage division effected by the second and fourth resistors R2 and R4 will thus be able to maintain a constant base bias at the base terminal 34 of the second transistor Q2, whereby the first current I1 in the first or input side of the bridge 10 will be maintained constant, the magnitude of said current I1 being the quotient of the voltage drop across the second Zener diode DZ2 and the resistance of the fifth resistance R5.

The same operation applies in the second current generator G2, the current I2 through the second or reference side of the bridge 10 being maintained constant. Thus, the third transistor Q3 regulates the base bias appearing at the base terminal 46 of the fourth transistor Q4 to effect a constant current (I2) through the fixed load ninth resistance R9 in the emitter circuit of the said fourth transistor Q4.

In both said current generators G1 and G2 the similarity of electrical properties between the associated transistors precludes any variation in the supply currents I1 and I2 because of ambient temperature variations, the said generators being self-compensating in this regard.

In order to effect a calibrated output voltage function in response to the induced variations in the input resistance RV by a parameter being monitored, the initial potential of the second output terminal 18 in the reference side of the bridge 10 must be selectively adjustable, i.e., there must be a zero setting means provided. This is accomplished by the reference resistance network RR to provide a zero-set or starting output voltage across the output terminals 16 and 18 with its zero reference determined by the load resistance RZ in the reference side of the bridge 10.

The load resistance RZ in the reference side of the bridge 10 is the series equivalent of that portion of the reference network RR which is seen by the second generated current I2 from the positive lead P1 to the second output terminal 18 and as will be more fully described is selected to be as follows:

$$RZ=Rc+\frac{Rb}{2}$$

where R*b* is equal to twice the operating span of the input resistance RV.

The other values in the reference network are chosen to be related at the nominal setting thereof as follows:

$$Ra+Rb=Rd+\frac{Re}{2}$$

where the half value of the variable resistance R*e* is the nominal setting at which the reference current I2 will divide equally between the circuit branches R*a*–R*b* and R*d*–R*e* in the reference network RR.

The output voltage E*o* across the output terminals 16 and 18 of the bridge 10 is defined as the difference in the voltage drops across the input resistance RV and the fixed load resistance RZ.

Since the potentials E16 and E18, respectively, at the first and second output terminal 16 and 18 are determined by the I–R drop through the input resistance RV and the fixed load resistance RZ, i.e.:

$$E_{16}=E_{P1}-I1RV$$

$$E_{18}=E_{P1}-\left[12(Rc)+\frac{I2}{x}(Rb)\right]$$

where *x*, in the latter equation is the proportional factor controlled by the setting of the variable resistance *Re* to control the proportion of the total reference current I2 which will flow through the resistance R*b* and determine the potential $E_{18}$. Thus, the output voltage $$E_o=E_{18}-E_{16} \text{ or } E_o=I1RV-I2\left(Re+\frac{Rb}{x}\right)$$

which, at the nominal setting of R*e* wherein the current I2 divides evenly, $$E_o=I1RV-I2\left(Rc+\frac{Rb}{2}\right)$$

In order that any adjustment of the division of the current I2 through the branches of the reference network RR is proportional to the proportional band or span of the input resistance RV, the span ΔRV is determined and the resistance R$b$ is selected such that $Rb=2\Delta RV$, this being chosen since one-half of the reference current I2 flows through R$b$ at the nominal setting of the reference network RR and further, since for ease of calibration the bridge 10 is operated with the first and second reference currents being equal.

The variable resistance R$e$ in the reference network RR thus provides a zero adjustment of the reference side of the bridge 10 which can compensate for component parameter variations with the full range of zero adjustment being proportional to the full span of the input resistance RV.

Since the starting or zero value E$o'$ of the output voltage E$o$ is to be selectively variable and would more than likely have a value other than zero, the importance of a correlated zero setting means and the operating span of the input variable is readily appreciated.

Thus, assuming a change in the value of the input resistance RV in functional response to the variable parameter being monitored by the bridge 10, the constant current I1 therein will cause a variation in the I1RV voltage drop and thus cause an incremental change in the output voltage E$o$, the said incremental change being directly proportional to the variation of the input resistance and thus bearing the same functional relationship to the change in the monitored variable parameter as the variable input resistance RV.

The third coupling resistance R3 in the first current generator G1 and the eighth coupling resistance R8 in the second current generator G2 provide an impedance match for the purpose of equalizing the base currents of the first and third transistors Q1 and Q3, respectively. Because of the location of these resistances R3 and R8 in the two current generators G1 and G2, respectively, the temperature coefficients of the said current generators may be to either positive or negative merely by increasing or decreasing, respectively, the values of the third and eighth coupling resistances R3 and R8. The necessity for such compensation arises because of the impedance presented to the emitter terminals 32 and 44 by the second Zener diode DZ2 and the difference in impedance to the emitter terminals 38 and 50 by the fifth and ninth reference resistances R5 and R9, respectively. In the absence of such compensation as provided by the said coupling resistances R3 and R8, the base currents drawn by the respective transistors in the said current generators G1 and G2 would be unequal, causing the respective base-to-emitter voltages to be unequal and preclude proper coordinated tracking of these voltages in maintaining constant current outputs from the said current generators G1 and G2.

As can be seen from the foregoing specification and drawing, this invention provides a new and novel direct current energized resistance bridge circuit utilizing a new and novel concept of constant current energization and thereby satisfying a long felt need in the art for a resistance bridge operable at optimally low supply voltages and preclusive of the non-linear effects of bridge loading.

It is to be understood that the embodiment shown and described herein is exemplary and is not intended to limit the scope of the appended claims.

We claim:

1. A direct current resistance bridge comprising first and second input terminals, first and second pairs of bridge arms comprising, respectively, first and second current paths between said first and second input terminals, said current paths including, respectively, first and second output terminals, and first and second constant current generator means providing, when energized, first and second constant reference currents through said first and second current paths, respectively.

2. The invention defined in claim 1, wherein said bridge further includes a reference node, reference voltage means maintaining a reference voltage at said reference node and circuit means transmitting said reference voltage from said reference node to said first and second constant current generator means.

3. The invention defined in claim 1, wherein said first pair of bridge arms includes condition responsive variable input resistance means in circuit between said first input and output terminals and said second pair of bridge arms includes reference resistance network means in circuit between said first input terminal and said second current generator means and including said second output terminal.

4. The invention defined in claim 3, wherein said reference resistance network means includes fixed resistance means in series with first and second parallel circuit branches, said first circuit branch comprising voltage divider resistance means having said second output terminal as a common node therein and said second circuit branch comprising selectively variable resistance means, said parallel circuit branches comprising a selectively variable current divider network effecting selective apportionment of said second constant reference current through said parallel branches and thereby selectively controlling the voltage difference between said first input terminal and said second output terminal by adjustment of said selectively variable resistance means in said second circuit branch.

5. The invention defined in claim 1, wherein said first pair of bridge arms includes condition responsive variable input resistance means in circuit between said first input and output terminals and said second pair of bridge arms includes reference resistance network means in circuit between said first input terminal and said second current generator means and including said second output terminal; said reference resistance network means including first fixed resistance means effecting a predetermined voltage drop from said first input terminal to said second output terminal in response to said second constant reference current, and second variable resistance means selectively shunting said first fixed resistance means to selectively divide the flow of said second constant reference current between said first and second resistance means and effect a selectively variable voltage drop between said first input and said second output terminal.

6. The invention defined in claim 1, wherein said first pair of bridge arms includes condition responsive variable input resistance means in circuit between said first input and output terminals and said second pair of bridge arms includes reference resistance network means in circuit between said first input terminal and said second current generator means and including said second output terminal; said reference resistance network means including selectively variable and fixed resistance means, energized by said second constant reference current, effecting a selectively variable voltage drop from said first input terminal to said second output terminal.

7. The invention defined in claim 1, wherein said bridge further includes a voltage source and reference means energized by said voltage source providing a reference voltage; and wherein said constant current generator means each comprise direct current amplifier means including an input circuit and an output circuit, said output circuit comprising a constant current path in series with a respective one of said first and second current paths, said input circuit being connected across said voltage source and constrained by said reference voltage to maintain a constant output current in said output circuit.

8. The invention defined in claim 7, wherein each said direct current amplifier means comprises, first transistor means having a first base terminal and a first collector-emitter current path, including a first collector and a first emitter terminal; second transistor means having a second base terminal and a second collector-emitter current path including a second collector and a second emitter terminal, each said second collector-emitter current path comprising a constant current path in series with a respective one of said first and second current paths; a voltage divider across said voltage source having an intermediate voltage node in circuit with said first and second base terminals; said second collector and emitter terminals, respectively, being connected through fixed resistance means to respective sides of said voltage source; said first collector terminals being connected through fixed resistance means to one side of said voltage source and said first emitter terminal being maintained at said reference voltage.

9. The invention defined in claim 8, wherein said direct current amplifier means further includes impedance matching circuit means interconnecting said intermediate voltage node and said first base terminal.

10. In a direct current resistance bridge including first and second input terminals and first and second parallel current paths between said first and second input terminals, energizing means for said bridge comprising constant current generator means providing a constant reference current flow in said first and second parallel current paths.

11. The invention defined in claim 10, wherein said constant current generator means comprises a voltage source, reference means energized by said source providing a reference voltage, and direct current amplifier means including an input circuit and an output circuit, said output circuit comprising a constant current path in series with each said first and second parallel current paths, said input circuit being connected across said voltage source and constrained by said reference voltage to maintain a constant output current in said output circuit.

12. The invention defined in claim 11, wherein said direct current amplifier means comprises, at each of said parallel current paths, first transistor means having a first base terminal and a first collector-emitter current path including a first collector and a first emitter terminal; second transistor means having a second base terminal and a second collector-emitter current path, including a second collector and a second emitter terminal, each said second collector-emitter current path comprising a constant current path in series with a respective one of said parallel current paths; a voltage divider across said voltage source having an intermediate voltage node in circuit with said first and second base terminals; said second collector and emitter treminals, respectively, being connected through fixed resistance means to respective sides of said voltage source; said first collector terminal being connected through fixed resistance means to one side of said voltage source and said first emitter terminal being maintained at said reference voltage.

13. The invention defined in claim 12, wherein said direct current amplifier means further includes impedance matching circuit means interconnecting said intermediate voltage node and said first base terminal.

No References Cited.

JOHN F. COUCH, *Primary Examiner.*

WARREN E. RAY, *Examiner.*